(12) United States Patent
Kristensen (10) Patent No.: US 11,092,173 B2
(45) Date of Patent: Aug. 17, 2021

(54) FLOW CONTROL FOR AN ACTUATOR

(71) Applicant: Siemens Gamesa Renewable Energy A/S, Brande (DK)

(72) Inventor: Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/795,729

(22) Filed: Feb. 20, 2020

(65) Prior Publication Data
US 2020/0271136 A1 Aug. 27, 2020

(30) Foreign Application Priority Data
Feb. 25, 2019 (EP) .................................... 19159142

(51) Int. Cl.
*F15B 13/042* (2006.01)
*F15B 13/04* (2006.01)
*F15B 13/044* (2006.01)

(52) U.S. Cl.
CPC ............ *F15B 13/042* (2013.01); *F15B 13/04* (2013.01); *F15B 13/044* (2013.01); *F15B 2211/45* (2013.01); *F15B 2211/634* (2013.01)

(58) Field of Classification Search
CPC ...... F15B 13/042; F15B 13/04; F15B 13/044; F15B 2211/634; F15B 2211/45
See application file for complete search history.

(56) References Cited

U.S. PATENT DOCUMENTS

| 4,429,619 | A  | * | 2/1984  | Leutner  | F15B 11/0426 137/100 |
| 4,485,724 | A  | * | 12/1984 | Demircan | E21D 23/26 91/29 |
| 8,607,559 | B2 | * | 12/2013 | Dybing   | F15B 11/0423 60/468 |
| 9,423,800 | B2 | * | 8/2016  | Rannow   | G05D 7/0617 |

(Continued)

FOREIGN PATENT DOCUMENTS

EP 2610503 A2 7/2013

OTHER PUBLICATIONS

European Search Report dated Sep. 16, 2019 for Application No. 19159142.9.

*Primary Examiner* — Thomas E Lazo
(74) *Attorney, Agent, or Firm* — Schmeiser, Olsen & Watts LLP (57) ABSTRACT

A flow control circuit for an actuator is provided. The actuator includes a first chamber and a second chamber, wherein the first chamber experiences a volume change that is larger than a volume change experienced by the second chamber upon actuation of the actuator. The flow control circuit includes a first port configured to be connected to the first chamber, a second port configured to be connected to the second chamber, and a flow control valve assembly including one or more valves configured to provide a flow of pressurized fluid from a pressurized fluid source to one of the first and second ports along a fluid supply path and further configured to provide a flow of fluid from the other of the first and second ports to a fluid sink along a fluid return path. The flow control circuit further includes a fluid bypass path comprising a bypass valve.

13 Claims, 4 Drawing Sheets

(56) References Cited

U.S. PATENT DOCUMENTS

2006/0230752 A1* 10/2006 Sawada ................ F15B 11/024
 60/431
2018/0051444 A1* 2/2018 Yamashita ............. E02F 9/226
2018/0128290 A1* 5/2018 Wang ...................... F15B 19/00

* cited by examiner

FLOW CONTROL FOR AN ACTUATOR

CROSS-REFERENCE TO RELATED APPLICATIONS

This application claims priority to European Application No. 19159142.9, having a filing date of Feb. 25, 2019, the entire contents of which are hereby incorporated by reference.

FIELD OF TECHNOLOGY

The following relates to a flow control circuit for an actuator, to a system comprising the actuator and such flow control circuit and to a method of controlling a flow control circuit. The following relates in particular to a flow control circuit that provides an asymmetric flow capacity.

BACKGROUND

Many systems and devices employ actuators for applying a force, such as hydraulic or pneumatic actuators. Examples include the pitching of a rotor blade of a wind turbine, wherein the actuator rotates the rotor blade around its longitudinal axis. Another example is a machine press or forming press in which a moving element that comprises a template of the shape to be produced is actuated by a respective actuator.

Such fluid power applications can for example include a differential area cylinder, in particular a hydraulic cylinder, that is controlled by a valve capable of continuously varying the flow from the pump or supply line to one chamber of the cylinder, and/or from the opposing chamber of the cylinder to a return line or reservoir. In some of these applications, the maximum flow rate of the flow path into the cylinder and of the flow path out of the cylinder can differ significantly. For example, actuator speeds may be higher in one direction than in the opposing direction. Further, the volume displacement in one chamber of the cylinder may be different to the volume displacement in the other chamber of the cylinder when operating such actuator. An actuator in form of a hydraulic or pneumatic cylinder may for example have a ratio of the areas on either side of a piston that separates the two chambers in the cylinder (area ratio) which is different from one.

The actuator can for example comprise a cylinder in which two chambers are separated by a moveable piston to which a rod is attached, wherein providing a fluid into one chamber of the cylinder generates a force that moves the piston and thus actuates the actuator. On the side of the piston where the rod is attached, the piston area that is in contact with the actuating fluid is smaller. The actuating force and the fluid displacement upon operation of the actuator are reduced when pressurizing this rod side chamber.

In conventional systems, to account for the different flows, proportional directional valves are employed that are rated for the largest of the flows. The valves that are used in such systems are thus relatively large and heavy, and are cost extensive. Further, a relatively low utilization may result for one or more of the other flow paths. For flow paths where flow rates are smaller than the rated flow rates, it is more difficult to control the flows. Furthermore, flow instabilities may result, for example when there is a large pressure drop across the spool of such valve, yet the spool opening has to be kept small to achieve the required small flow rate.

It is desirable improve the utilization of the available flow paths and to reduce such flow instabilities. Furthermore, it is desirable to use smaller and more lightweight valves.

SUMMARY

An aspect relates to an improved flow control for an actuator. There is in particular a need to allow the use of more compact and light weight valves and to improve the flow stability.

According to an embodiment of the invention, a flow control circuit for an actuator, in particular a hydraulic or pneumatic actuator, that comprises a first chamber and a second chamber is provided. The actuator has a configuration in which the first chamber experiences a volume change that is larger than a volume change experienced by the second chamber upon actuation of the actuator. The flow control circuit comprises a first port configured to be connected to the first chamber and a second port configured to be connected to the second chamber. It further comprises a flow control valve assembly that comprises one or more valves configured to provide a flow of pressurized fluid from a pressurized fluid source to one of the first and second ports along a fluid supply path. The flow control valve assembly is further configured to provide a flow of fluid from the other of the first and second ports to a fluid sink along a fluid return path. The flow control circuit further comprises a fluid bypass path comprising a bypass valve. The bypass valve can be controlled so as to open or close the bypass valve to allow or block the flow of fluid through the fluid bypass path. The fluid bypass path is connected to the first port and is further connected hydraulically or pneumatically parallel to the control valve assembly.

By means of such flow control circuit, it becomes possible to provide higher flow rates via the first port while not having to use a flow control valve assembly that is rated for such high flow rates. In particular, by providing the fluid bypass path, part of the flow via the first port can be accommodated by the fluid bypass path, so that the one or more valves of the flow control valve assembly can have a lower flow rate rating and can thus be more compact and less costly. Besides a reduced size and weight of the flow control valve assembly, the controllability in the other flow path via the second port may be improved. The utilization of the other flow path may be increased so that the flow rate in such path is closer to the rated flow rate of the control valve assembly. Controllability of the flow path can thus be improved, and flow instabilities may be reduced. A more compact and light weight flow control circuit with improved flow control and reduced flow instabilities may thus be achieved.

The bypass path may in particular be connected in parallel to the flow path requiring the highest flow rate capacity. The fluid bypass path may comprise respective fluid conduits that connect the bypass valve upstream and downstream of the flow control valve assembly in parallel to the respective flow path. The flow control circuit may in particular be configured to provide at the first port a flow rate that is larger than a flow rate provided at the second port.

In an embodiment, the flow control valve assembly is configured to provide proportional flow control for at least one of the fluid supply path and the fluid return path. The flow control valve assembly may comprise a proportional directional valve that is capable of controlling the direction of the flow and the flow rate in the fluid supply path and/or in the fluid return path. In other embodiments, the flow control valve assembly may comprise a proportional valve in the fluid supply path, a proportional valve in the fluid return path, and/or a directional valve. It may for example comprise a proportional valve connected to the first port and/or a proportional valve connected to the second port, so that the flow rate into the first actuator chamber and into the second actuator chamber can be controlled in order to control the speed of the actuator in one or both directions.

The flow control valve assembly may comprise a directional valve that has at least two valve positions. In a first valve position, the directional valve provides flow communication between the first port and the pressurized fluid source and between the second port and the fluid sink. In a second valve position, the directional valve provides a flow communication between the first port and the fluid sink and between the second port and the pressurized fluid source. Accordingly, in the first valve position, a piston of the actuator separating the first and second chambers may be pushed towards the second chamber, thus applying a force in a first direction. In the second valve position, the fluid flowing into the second chamber may push the piston towards the first chamber and may thus apply a force in the opposite direction. The directional valve may have a third valve position in which no connection between the first and second ports and the fluid source or fluid sink exists. It should be clear that the directional valve may have further or different valve positions, such as a position in which a flow communication between fluid source and fluid sink is provided.

The directional valve is part of a proportional directional valve that furthermore provides control of the flow rate via the first port and via the second port.

In an embodiment, the fluid bypass path has a first end at which it is connected to the first port, and has furthermore a second end at which it is connected to the pressurized fluid source and/or the fluid sink. The flow control circuit may for example comprise two bypass paths, one between the first port and the pressurized fluid source, and the second between the first port and the fluid sink. When the bypass path is connected to the pressurized fluid source, the flow control circuit is capable of giving out fluid at high flow rate via the first port to provide fast actuator movement in the respective direction. If it comprises a bypass path connected to the fluid sink, it is capable of draining fluid at a high flow rate via the first port towards the fluid sink for allowing a fast actuator movement in the opposite direction. One or two bypass paths connected to the fluid source or to the fluid sink may thus be provided, depending on the application and the requirements for actuator movement. Each bypass path may be provided with a respective bypass valve.

In an embodiment, the bypass valve is an on/off valve that is controllable by means of an electric or a fluidic control signal. The bypass valve may for example be a solenoid valve that can be switched on or off. A bypass path having a low complexity and being relatively simple to control may thus be provided. In other embodiments, a more complex bypass valve, such as a proportional valve, may be provided.

The bypass path may further comprise at least one of a flow control valve, a pressure compensator, or a pressure compensated flow control valve. The flow rate via the bypass path may thus be controlled to a predetermined value and may be kept stable. The combination of the flow control valve assembly and the bypass path is thus still capable of providing a precise control of the flow rate via the first port. A pressure compensator may for example be configured to create a constant pressure drop across the on/off valve to thereby control the flow rate of the fluid flowing via the bypass path, in particular to keep the flow rate constant and independent of flow conditions.

The bypass path may be configured to provide a flow at a flow rate within a range of about 80% to about 100%, preferably 85% to 100%, more preferably 90% to 100% of the rated flow rate of the flow control valve assembly, in particular of a proportional directional valve thereof. A smooth transition between a range of flow rates when the bypass valve is closed and a range of flow rates when the bypass valve is open can thus be achieved.

In an embodiment, the flow control circuit further comprises a control unit. The control unit is configured to perform the steps of obtaining an indication or determining that an actual flow rate or target flow rate via the first port reaches or exceeds a predetermined threshold value and, upon obtaining a respective indication, opening the bypass valve to allow fluid flow through the fluid bypass path. By means of such control unit, a precise control of the flow rate via the first port over a relatively wide range of flow rates may be achieved. In particular, below the threshold value, the flow rate may be controlled by the flow control valve assembly, which can have a relatively low rating and thus can provide a fine control of flow rate. Above the threshold value, the flow rate at the first port is provided by the flows via the bypass path and via the flow control valve assembly, so that also in this range of flow rates, a precise and fine control of the flow rate by means of the flow control valve assembly becomes possible.

The threshold value may for example correspond to the maximum flow rate rating of the flow control valve assembly, in particular of a respective proportional directional valve, or it may be slightly lower than such rating to provide a safety margin.

The bypass path may be configured to provide a flow rate that corresponds to the flow rate rating of the flow control valve assembly, in particular of a respective proportional directional valve, or to the above-mentioned threshold value. By such configuration, fine control of the flow rate over the whole range of flow rates that can be provided via the first port becomes possible, and the flow rate that can be provided via the first port can be increased by a factor of two compared to the flow rate provided by the flow control valve assembly alone.

The threshold value may for example correspond to a predetermined utilization of the flow rate capacity provided by the flow control valve assembly (such as 95% or less, 90% or less, 85% or less or 80% or less).

The control unit may for example be configured to obtain a target flow rate by determining the target flow rate based on a control target for the actuator, such as a target speed or target position of the actuator. The control unit may additionally or alternatively obtain the actual flow rate via the first port by measuring a value indicative of this flow rate, for example by reading a signal from a sensor indicative of the position of a proportional (or proportional directional) valve connected to the first port or by reading a signal from a flow rate sensor or the like. The control unit may additionally or alternatively obtain an indication of a target flow rate by receiving a value indicative of the target flow rate at an input of the control unit, for example from a further controller, such as a feedback controller that controls the position of the actuator. The control unit may comprise an input for reading or receiving the respective values or signals.

The control unit may further be configured to obtain an indication that the flow rate via the first port has reached or has dropped below a predetermined threshold value, which may be the same as the above mentioned threshold value or may be a different threshold value, and, upon obtaining a respective indication, to close the bypass valve to block the flow of fluid through the fluid bypass path. The bypass path may thus be closed again to lower flow rate so that a fine control of the flow rate via the flow control valve assembly is achieved at such low flow rates.

In an embodiment, the flow control circuit comprises a control unit that is configured to receive an indication of a desired actuator position or actuator speed, to determine a target flow rate based on the desired actuator position or actuator speed and to control the flow control circuit so as to provide the target flow rate at the first port. When controlling the flow control circuit, the control unit determines if the target flow rate reaches or exceeds a threshold value, and if the threshold value is reached or exceeded, it opens the bypass valve and controls the flow control valve assembly so as to provide the target flow rate at the first port.

The desired actuator speed and/or position may correspond to a desired pitch angle and/or change of the pitch angle of a rotor blade of a wind turbine rotor. By providing such control of the bypass path, it may be possible to reach the target actuator position in a fast and efficient way by providing high flow rates of the fluid, while only requiring a control of a valve assembly rated for lower flow rates.

In an embodiment, the flow control valve assembly comprises a position sensor for determining a position of a proportional valve (in particular of a proportional directional valve) of the flow control valve assembly which controls the flow via the first port. A control unit of the flow control circuit is configured to determine a position of the proportional valve based on a signal from the position sensor. The position of the proportional valve may correspond to a particular flow rate via the first port. If the control unit determines, based on the proportional valve position, that the flow rate via the first port exceeds a predetermined threshold value, it opens the bypass valve to allow a fluid flow through the fluid bypass path. The control may again be based on a target position for the proportional valve that is derived from a desire flow rate via the first port. An efficient control of the flow through the bypass path may thus be implemented which may only use parameters internal to the flow control circuit, such as the proportional valve position.

Other possibilities for controlling the flow through the bypass path are certainly conceivable. As an example, a pressure drop across the control valve assembly for the path towards the first port may be monitored or a flow rate downstream or upstream of the control valve assembly for the flow path towards the first port may be monitored to determine when the bypass path should be opened to increase the flow capacity.

The actuator is a hydraulic cylinder. The flow control circuit may further comprise the fluid, which may be a liquid, in particular a hydraulic liquid such as hydraulic oil or the like. The flow control circuit may furthermore comprise the pressurized fluid source, in particular a pump, an accumulator or the like.

According to a further embodiment of the invention, a system comprising an actuator that includes a first chamber and a second chamber is provided. The first chamber experiences a larger volume change upon actuation of the actuator than the second chamber. The system further comprises a flow control circuit in any of the above outlined configurations, wherein the first port of the flow control circuit is connected to the first chamber of the actuator and the second port of the flow control circuit is connected to the second chamber of the actuator.

The actuator may in particular comprise a piston separating the first chamber from the second chamber and a rod coupled to the piston and extending, at least partly, through the second chamber. In such configuration, if the piston moves, the volume change in the second chamber is smaller than the volume change in the first chamber where no such piston rod is present. The actuator can be mechanically coupled to a wind turbine rotor blade such that an actuation of the actuator results in a rotation of the rotor blade around its longitudinal axis to adjust the pitch angle of the rotor blade. The system may comprise such wind turbine rotor blade.

According to a further embodiment of the present invention, a method of controlling a flow control circuit or an actuator is provided. The flow control circuit can have any of the above outlined configurations. The method comprises opening or closing the bypass valve so as to allow or block the flow of fluid through the fluid bypass path. In particular, the method may employ a controller in any of the above described configurations to control the opening and closing of the bypass valve and thus of the flow through the bypass path. The method may include the providing of a control signal or of a control flow (in case of a hydraulically actuated valve) from such controller to the bypass valve. The method may furthermore include any of the above outlined method steps.

By such method, advantages similar to the ones outlined further above with respect to the flow control circuit may be achieved.

In an exemplary embodiment, the method comprises obtaining an indication that an actual flow rate or a target flow rate via the first port reaches or exceeds a predetermined threshold value and, upon obtaining a respective indication, opening the bypass valve to enable a fluid flow through the fluid bypass path.

According to a further embodiment of the invention, a computer program for controlling a flow control circuit is provided. The computer program comprises control instructions which, when executed by a data processor, cause the data processor to perform any of the methods described above. The computer program, in particular the control instructions, can be provided on a volatile or non-volatile data carrier or in a respective memory. The above-mentioned control unit may for example comprise a respective data processor and memory in which such control instructions are stored.

It is to be understood that the features mentioned above and those yet to be explained below can be used not only in the respective combinations indicated, but also in other combinations or in isolation, without leaving the scope of embodiments of the present invention.

BRIEF DESCRIPTION

Some of the embodiments will be described in detail, with references to the following Figures, wherein like designations denote like members, wherein.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

Figure 1:
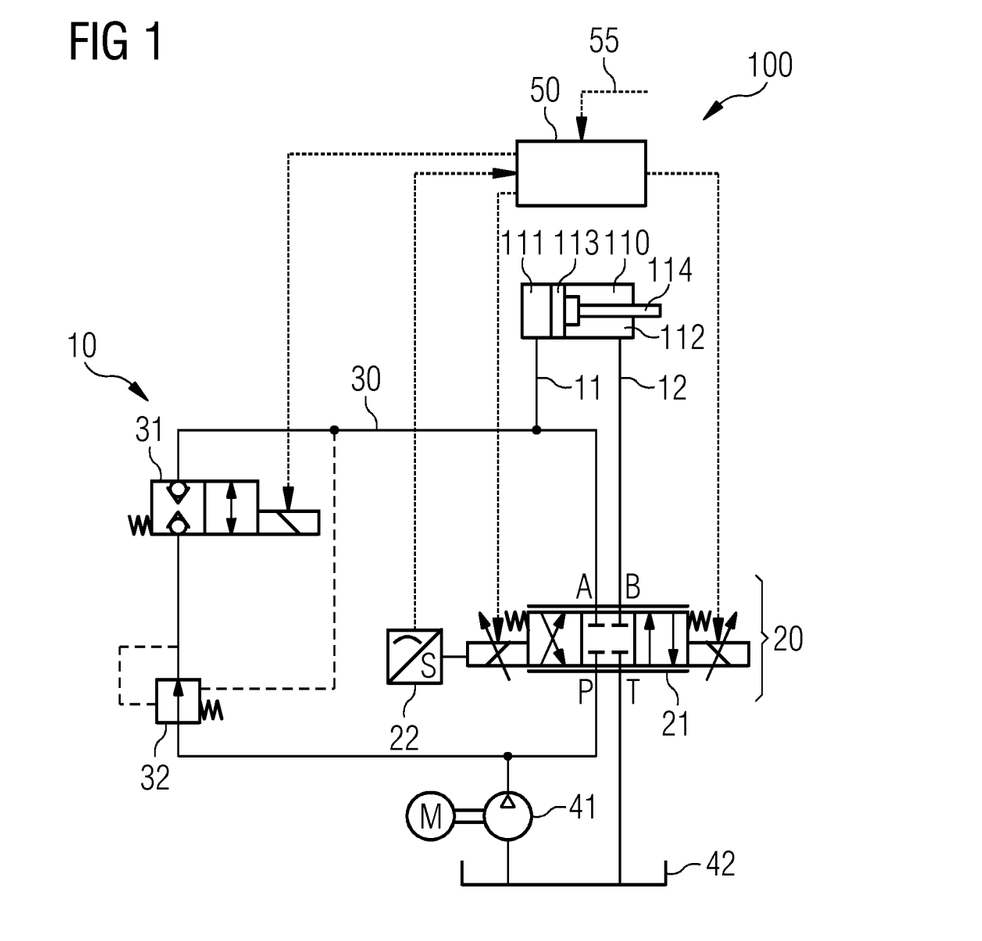
FIG. 1 is a schematic drawing showing a flow control circuit and a system in accordance with an embodiment of the invention.

FIG. 1 shows schematically a flow control circuit 10 for operating an actuator 110. In the present example, the flow control circuit is a hydraulic circuit and actuator 110 is a hydraulic cylinder, but a pneumatic circuit and a pneumatic actuator may be used in other embodiments. The actuator 110 is a differential-area hydraulic cylinder that includes a first chamber 111, a second chamber 112, and a piston 113 separating the first and second chambers. A rod 114 for transmitting mechanical force is mounted to the piston 113. By providing fluid, in particular pressurized hydraulic liquid, into chamber 111, rod 114 is pushed out, and by providing pressurized hydraulic liquid into chamber 112, rod 114 is drawn into the actuator 110. The volume displaced in each chamber during such movement of the piston depends on the area on the respective side on the piston exposed to the liquid. As rod 114 covers part of that area, the area ratio, as defined by the piston area in chamber 111 divided by the annular area in chamber 112, is larger than one, and less volume is displaced in second chamber 112 than in the first chamber 111 when piston 113 moves. The hydraulic cylinder further comprises a cylindrical sleeve to which the piston is sealed and in which the piston moves. The sleeve, the piston and the rod may be made of steel.

To provide the flow of fluid into and out of the chambers of actuator 110, the flow control circuit 10 comprises a flow control valve assembly 20 that is connected via a first port 11 to the first chamber 111 of the actuator and via a second port 12 to the second camber 112 of the actuator 110. Ports 11 and 12 may comprise respective flow connections, in particular conduits, such as steel pipe for providing a flow connection into and out of the respective chamber. Ports 11, 12 may or may not comprise connectors for connecting the fluid conduits to the actuator 110. In the example of FIG. 1, the flow control valve assembly 20 comprises or consists of a proportional directional valve 21. Valve 21 has the function of a directional valve, as it can connect the first port 11 and correspondingly the second port 12 with either the pressurized fluid source 41 or the fluid sink 42. In FIG. 1, the valve 21 is illustrated in a blocking position in which a fluid flow between ports 11, 12 and the fluid source/fluid sink 41, 42 is interrupted or blocked.

Valve 21 has four ports. Port P is connected (e.g., directly) to the source of pressurized fluid 41, and port C is connected (e.g., directly) to the fluid sink 42. The valve 21 furthermore comprises a port A connected (e.g., directly) to the piston side chamber 111, and a port B connected (e.g., directly) to the rod side chamber 112. Valve 21 has a first valve position, as indicated by the parallel arrows, in which a flow path, i.e. a connection between ports, is provided between ports P and A (P-A), so that a flow connection between the pressurized fluid source 41 and the first port 11 and thus the first chamber 111 is established (supply line to piston side chamber connection). At the same time, a flow connection between ports T and B (B-T) and thus between the second port 12 and the fluid sink 42 is established (piston side chamber to return line connection). In such valve position, a fluid supply path along which fluid is supplied from pressurized fluid source 41 into the first chamber 111 and a fluid return path from the second chamber 112 to the fluid sink 42 are thus established.

In a second valve position of valve 21, as illustrated by the crossed arrows in the left-hand side block of the valve, a flow connection between ports A and T as well as B and P is established. In such switching state of valve 22, a fluid supply path from the pressurized fluid source 41 to the second port 12 and thus to the rod side chamber 112 is established. At the same time, a fluid return path from the first port 11, and thus the piston side chamber 111 to the fluid sink 42 is established. By means of the flow control valve assembly 20, in particular by a directional valve thereof, it is thus possible to supply pressurized fluid either into chamber 111 or chamber 112 of the actuator 110 to drive the actuator in one or the other direction.

As a proportional directional valve, the valve 21 is furthermore configured to be capable of controlling the flow rate in the respective flow path. In particular, the valve 21 may be configured to independently control the flow between 0% and 100% (the rated flow) via the ports A and B (and thus also via P and T, depending on the valve position) in accordance with a respective control signal. Valve 21 may for example adjust a spool opening to adjust the flow rate. Respective configurations of proportional directional valves are known to the skilled person and are thus not explained in more detail herein.

In a conventional system, the proportional directional valve 21 needs to be rated for the highest flow rate required into the chamber 111 having a larger volume displacement than chamber 112, and for the highest desired actuator speed. Significant flow rates thus have to be provided via port 11, for example for a fast extension of rod 114. This may even require the use of a two-stage proportional directional valve, which comprises a first stage that is electrically actuated and that provides a flow of control fluids to a second stage that is hydraulically actuated to achieve the required control forces and flow rates. All fluid paths through the proportional directional valve 21 are rated for the same flow rate, so that the fluid path towards the second port 12 generally has a low utilization rate, i.e. only 50% or less of the rated fluid flow may be present in the respective flow path. As outlined above, this may lead to flow instabilities, since the control of such small flow rates required a small spool opening of the proportional directional valve 21. The large pressure drop across the valve and the high forces across such small spool opening can lead to flow instabilities and thus in turn to unstable and unsmooth operation of the actuator 110. This is in particular so where the pressurized fluid source 41 is connected to the second port 12 and thus the rod side chamber 112.

The flow control circuit 10 of the present embodiment thus comprises a fluid bypass path 30 that is connected to the port requiring the higher flow capacity, which is the first port 11 in the present example. Bypass path 30 includes the bypass valve 31 that is configured to enable or disable a flow of the hydraulic fluid through the bypass path 30. In the example of FIG. 1, bypass valve 31 is a simple on/off valve that has a first valve position (illustrated) in which the flow through the valve is blocked and a second valve position (illustrated as double headed arrow) in which flow through the valve is allowed. In other embodiments, a more complex valve may be used as a bypass valve 31, for example a proportional valve or the like.

The bypass path 30 may comprise further flow control elements, such as a pressure compensator 32. Pressure compensator 32 adjusted the flow so as to achieve a constant pressure drop across the bypass valve 31. Any suitable pressure compensator known in the art may be employed for this purpose. In the present example, the pressure compensator 32 comprises an orifice and a compensator spool which is biased by a spring and to which pressures from positions in the bypass path before the bypass valve 31 and behind the bypass valve 31 are provided (dashed lines in FIG. 1). The pressure difference actuates the compensator spool which restricts flow through the compensator orifice such that the flow rate is adjusted to stabilize the pressure drop across bypass valve 31. The constant pressure drop leads to a stable flow rate through the bypass path 30 when the bypass valve 31 is open.

It should be clear that different valve configurations may be used in the bypass path 30. For example, a pressure compensated flow control valve may be used in the bypass path, additionally or alternatively to the on/off valve 31, or the bypass path 30 may only comprise the on/off valve 31. In even further configurations, the on/off valve 31 may be combined with a flow control valve, such as a proportional valve. By means of such configurations, a constant flow rate in the bypass path independent on the load conditions of the actuator 110 may be achieved.

The bypass path is hydraulically connected in parallel to the flow path of the flow control circuit 10 that requires the larger flow rate. This allows the use of a smaller proportional directional valve 21 that has a lower flow rate rating. Thereby, the size and weight of the proportional valve 21 can be reduced. Furthermore, the controllability of the flow in the other flow path can be improved, as the utilization rate of this flow path can be increased. Additionally, costs for such valve may be reduced.

Figure 2:
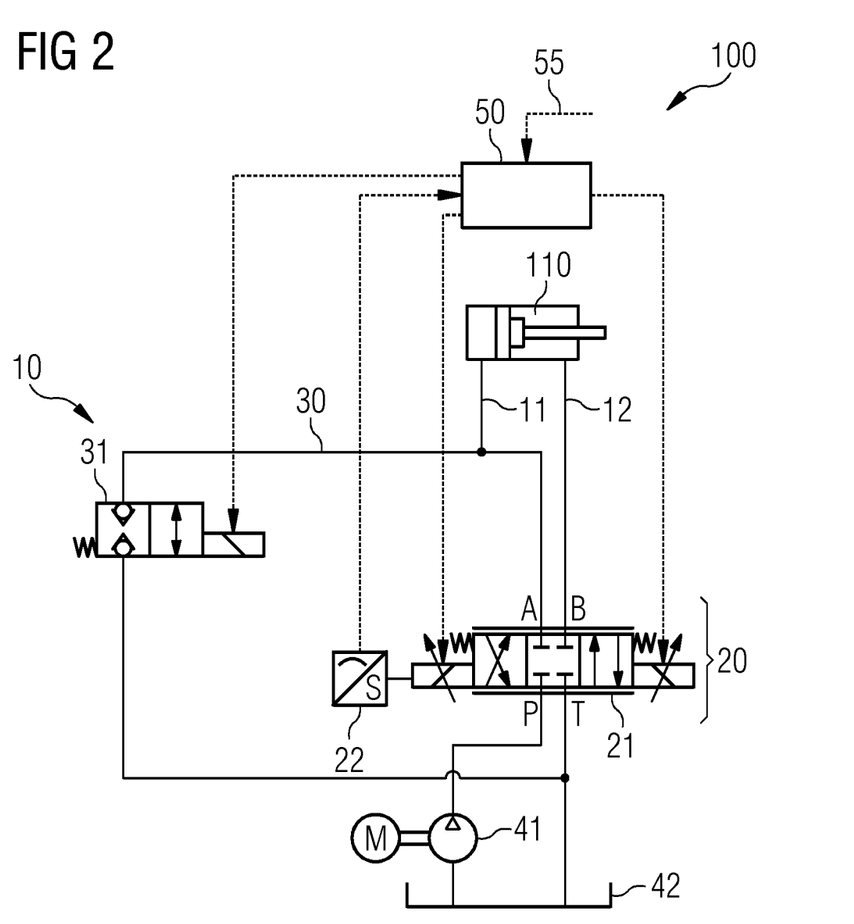
FIG. 2 is a schematic drawing showing a flow control circuit and a system in accordance with a further embodiment of the invention.

In the example of FIG. 1, the bypass path 30 is connected between the pressurized fluid source 41 and the first port 11. This way, the flow rate into the first chamber 111 of the actuator 110 can be increased to allow a fast extension of the rod 114. In other examples, where a fast retraction of rod 114 is desirable, the bypass path may be connected between the first port 11 and the fluid sink 42. Such example is illustrated in FIG. 2, where the bypass path 30 only includes the bypass valve 31 and is furthermore connected to the fluid sink 42. In other configurations, two bypass paths may be provided, one connected between the first port 11 and the pressurized fluid source 41, the second be connected between the first port 11 and the fluid sink 42. Each bypass path can comprise its respective bypass valve to control the flow through the bypass path. The flow rate of the flow into chamber 111 and out of chamber 111 may thus be increased, so as to enable fast actuator action in both directions.

The flow control circuit 10 can furthermore comprise the control unit 50 which controls the flow control valve assembly 20 and the bypass valve 31. When the requested flow rate in the flow path requiring the highest flow capacity, i.e. via the port 11 in the present example, exceeds a preset threshold value, which may correspond to a predefined utilization of the proportional directional valve 21, the flow control circuit 10 is operated in a high flow configuration by opening the bypass valve 31. A predefined flow rate through the bypass path 30 is thus added to the flow rate through the proportional directional valve 21. The flow capacity of the flow control circuit 10 is thus increased significantly. Control unit 50 may be configured to perform one or more control methods as described herein. For example, control unit 50 may receive at an input 55 an indication of a target flow rate, a target actuator position, a target actuator speed or the like. Based on such information, the control unit 50 may determine a flow rate required at one of the ports 11, 12.

Control unit 50 can operate with a preset threshold value for a flow rate to be provided via the proportional directional valve 21 through the port 11. If the target flow rate exceeds the threshold value, control unit 50 opens the bypass valve 31 and controls the actual flow to be equal to the target flow rate by adjusting the proportional directional valve 21. Below the threshold value, the control unit 50 closes the bypass valve 31 and only adjusts the flow rate by means of the proportional directional valve 21. The flow control circuit 10 can thus provide a fine adjustment of the flow rate over an extended range. The threshold values for opening the bypass valve 31 and for closing the bypass valve 31 may be different. To prevent a repeated opening and closing of the bypass valve 31 for target flow rates around such threshold, the threshold value for closing the bypass path 30 may for example be slightly lower than the threshold value for opening the bypass path. The threshold for opening the bypass valve 31 may for example lie within a range of 80% to 100% of the rated flow rate of proportional directional valve 21, within a range between about 85% and 100%, or even 90% and 100% of such rated flow rate.

The threshold value for flow rate via the first port 11 above which the bypass valve is opened in particular lies between the predetermined flow rate set for the bypass path and the rated flow rate of the flow control valve assembly 20 (in particular of valve 21).

For determining when to open the bypass valve 31, the control unit 50 may also monitor a sensor 22 that provides information about the opening of the proportional directional valve 21 and thus provides information about the current flow rate through valve 21. Sensor 22 may in particular provide spool position feedback to allow precise control of the valve opening. Control unit 50 may open the bypass valve 31 when the spool position reaches a certain threshold opening, or when a flow rate derived from the spool position exceeds a respective threshold value. In other configurations, the flow control circuit 10 may comprise dedicated sensors, such as flow rate sensors, to determine when the flow rate exceeds the threshold value to open the bypass valve 31.

It should be clear that the proportional directional valve 21 is only one exemplary implementation of the flow control valve assembly 20. In other configurations, separate proportional valves and directional valves may be provided in the flow control valve assembly 20 to control the flow through the first port 11 and through the second port 12. The bypass path 30 may bypass only a respective proportional valve, or may bypass only a respective directional valve, or may bypass the combination of proportional and directional valves. The bypassed valve may thus be provided with a lower flow rate rating and may thus be more compact and light weight, as well as less costly.

The pressurized fluid source 41 can be provided by a pump driven by a respective motor. The pump and the motor can form part of the flow control circuit 10. The fluid sink 42 may be provided by a reservoir or the like, which can form part of the flow control circuit 10. The flow control circuit 10 and the actuator 110 are part of the system 100. It should be clear that the flow control circuit 10 can comprise further components common to such hydraulic circuit, for example accumulators, further valves and the like.

As outlined above, FIG. 2 illustrates a variation of the flow control circuit 10 of FIG. 1 in which the bypass path 30 only comprises the bypass valve 31. The bypass path 30 is furthermore connected to the fluid sink 42. The above explanations are thus equally applicable to the embodiment of FIG. 2.

Figure 3:
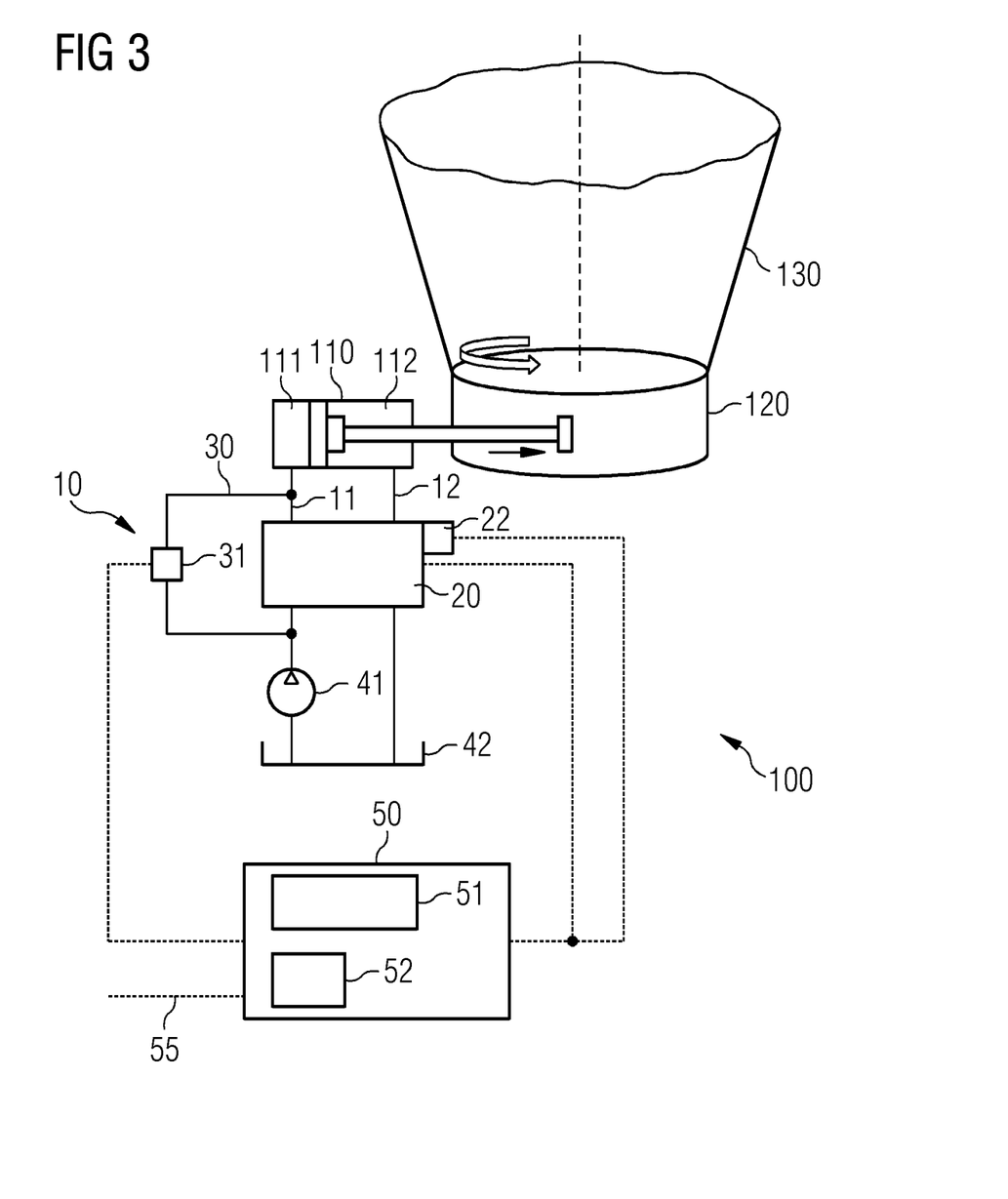
FIG. 3 is a schematic drawing showing a flow control circuit and a system in accordance with an embodiment of the invention.

FIG. 3 illustrates a further embodiment of the system 100 in which any of the above described flow control circuits is used to control an actuator in a wind turbine. The actuator 110 is coupled to the pitching mechanism 120 of a wind turbine rotor blade 130. Extension of the actuator 110, in particular of the hydraulic piston, results in a rotation of the rotor blade 130 around its longitudinal axis. Rotation in the direction of the arrow indicated in FIG. 3 may for example result in a so called pitching out the rotor blade, wherein the aerodynamic efficiency of the rotor blade and thus the amount of wind energy converted into mechanical energy is reduced. This may have to occur relatively fast in high wind situations to prevent damage to the rotor blade or to connected electrical equipment.

Flow control circuit 10 is thus configured to be capable of providing fluid at high flow rate into chamber 111 so that actuator action occurs at high speed in the respective direction. The bypass path 30 is therefore connected between the pressurized fluid source 41 and the first port 11, which provides the flow connection into the first or piston side chamber 111. Operation in the reverse direction (i.e. retraction of the actuator rod) may occur more slowly, so that only relatively low flow rates are required, and no additional bypass path has to be provided towards the fluid sink 42. As mentioned above, if a higher retraction speed of the actuator 110 is required, an additional fluid bypass path can be provided to fluid sink 42.

In operation, the control unit 50 may for example receive via input 55 a target actuator position for controlling the pitch angle of rotor blade 130. Control unit 50 may then determine an error signal based on the difference between the target position and the actual position of actuator 110. Based on such error signal, the controller 15 may determine a target flow rate to be provided into the respective actuator chamber, for example into the first chamber 111. Determination of the error signal and of the target flow rate may form part of a feedback control loop. In particular, the control unit 50 may implement a PID (proportional integral derivative) controller to adjust the flow rate provided by flow control circuit 10 in accordance with the target actuator position and the current actuator position. If the control unit 50 determines that the target flow rate is above the threshold value, i.e. is larger than a flow rate that can be delivered via the proportional directional valve 21, the control unit 50 opens the bypass valve 31 and controls the valve assembly 20 to achieve the desired target flow rate.

The pitching mechanism 120 may for example comprise a pitch bearing between the hub and the rotor blade and a lever arm to which the actuator 110 can apply a force to rotate the rotor blade 130.

In any of the configurations described herein, the control unit 50 can comprise a data processor 51 and a memory 52. The memory 52 stores control instructions that the data processor 51 can execute. The control instructions may be configured such that their execution on data processor 51 results in the execution of any of the control methods described herein. The data processor 51 may be a microprocessor, a digital signal processor (DSP), an application specific integrated circuit (ASIC), or the like. Memory 52 can comprise volatile and non-volatile memory, such as RAM, ROM, flash memory, a hard disk drive or the like.

Control unit 50 may comprise further components common to such control unit, such as an input/output interface for communicating with the valves and sensors, for example for receiving data signals including sensor or control information and for transmitting control signals to the valves.

Control unit 50 may be a dedicated control unit provided for the flow control circuit 10, or it may form part of a larger control unit, for example a pitch angle control unit or a wind turbine control unit that controls the whole wind turbine.

Figure 4:
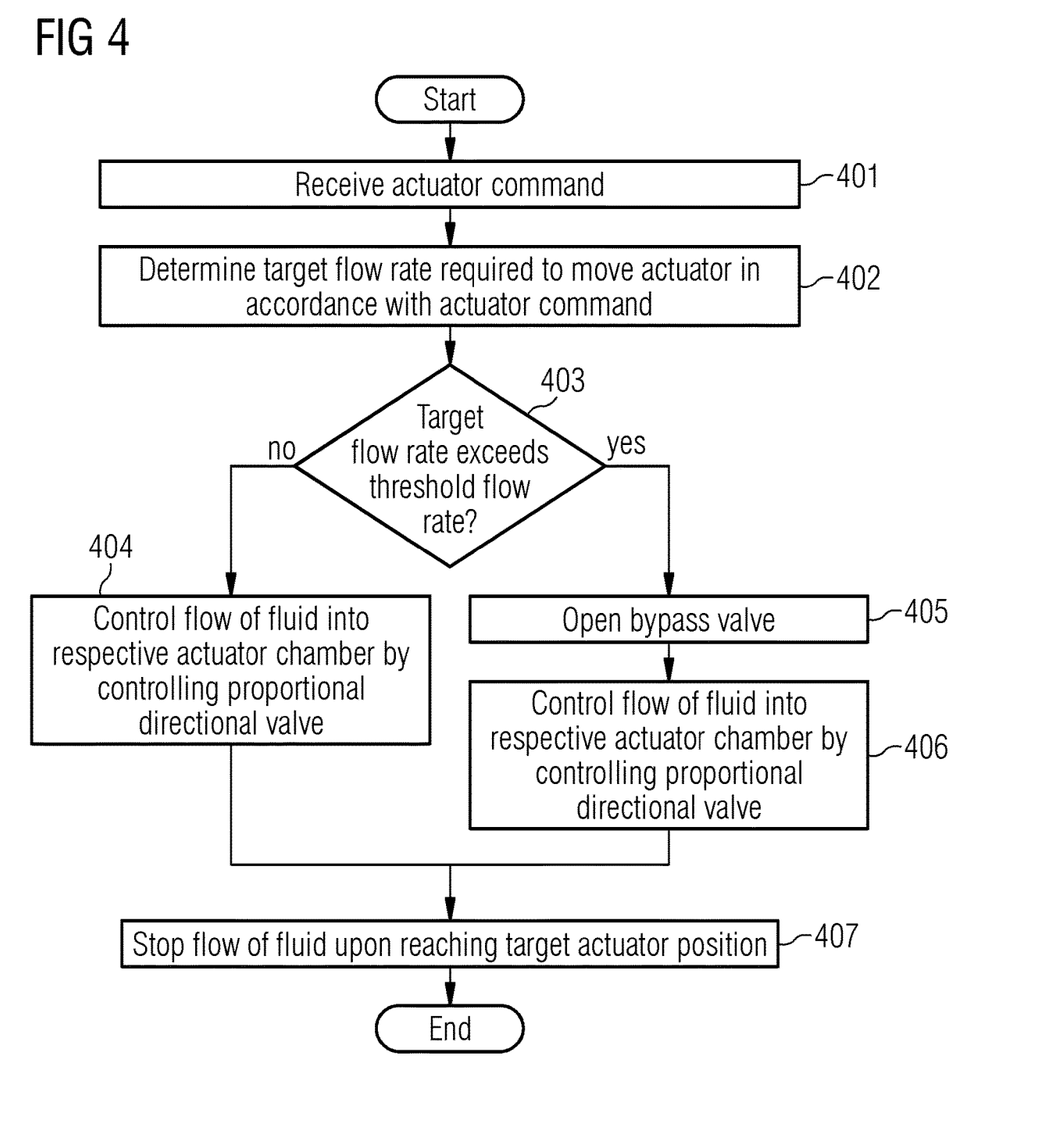
FIG. 4 is a schematic drawing showing a flow diagram of a method according to an embodiment of the invention.

FIG. 4 illustrates a flow diagram of a method according to an embodiment of the invention. In step 401, an actuator command is received, for example via input 55 of control unit 50. In step 402, a target flow rate is determined for moving the actuator in accordance with the actuator command, for example for moving the actuator to a target position or with a target speed. In the decision step 403, it is determined whether or not the target flow rate exceeds the threshold flow rate. Again, the threshold flow rate may be determined by the flow rate capacity of the flow control valve assembly 20, in particular of the proportional directional valve 21. If the threshold flow rate is not exceeded, the proportional directional valve 21 is controlled so as to provide fluid at the respective flow rate into the respective actuator chamber. If the target flow rate exceeds the threshold value, the bypass valve is opened in step 405. By controlling the proportional directional valve, the combined flow rate of the bypass path and of the flow path via the proportional directional valve is then adjusted to the target flow rate and provided into the respective actuator chamber (step 406). When the target actuator position is reached, the flow of fluid into the respective actuator chamber is stopped (step 407). It should be clear that the method illustrated in FIG. 4 is only an exemplary method, and that it may comprise any of the method steps described herein. Further, some steps are optional, such as steps 401 and 402, as only a target flow rate may be received.

The above embodiments are described with respect to an application in which the flow into the chambers of an actuator is controlled. The control is not limited to such applications, and the flow control circuit 10 may be employed in any application that requires an asymmetric flow capacity, i.e. that requires a larger flow rate on one port and only a lower flow rate at the other port of the flow control circuit. Further, applications with respect to a wind turbine are described above. It should be clear that the flow control circuit and the system can be applied in different environments, for example for an actuator of a press, such as a steel press which generally requires a fast movement in one direction and only a slower movement in the other direction.

Embodiments described herein allow the use of a smaller proportional directional valve, resulting in size, weight and costs savings. In particular, in applications where conventionally, a two-stage proportional directional valve has to be employed to achieve the desired flow rates, embodiments of the invention can allow the replacement of such two-stage valve by a single stage valve. Such single stage valve is not only smaller and cheaper, but has the further advantage of being less complex and thus more reliable. To achieve a fine resolution of flow rate control by a proportional directional valve, the full flow capacity through the valve has to be used, i.e. the full range of the control signal. By addition of the fixed flow via the bypass path, such fine resolution can be extended to a larger range of flow rates. When the flow rate through the bypass path is set to a value corresponding to the flow rate capacity of the proportional directional valve (or slightly lower), the capacity of the flow control circuit for the respective flow path can be increased by up to 100%.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A flow control circuit for an actuator that comprises a first chamber and a second chamber, wherein the first chamber experiences a volume change that is larger than a volume change experienced by the second chamber upon actuation of the actuator, the flow control circuit comprising:
  a first port configured to be connected to the first chamber;
  a second port configured to be connected to the second chamber;
  a flow control valve assembly comprising one or more valves configured to provide a flow of pressurized fluid from a pressurized fluid source to one of the first port and the second port along a fluid supply path and further configured to provide a flow of fluid from the other of the first port and second port to a fluid sink along a fluid return path;
  a fluid bypass path comprising a bypass valve, wherein the bypass valve is controllable to open or close the bypass valve so as to allow or block the flow of fluid through the fluid bypass path, wherein the fluid bypass path is connected to the first port and is connected in parallel to the control valve assembly; and
  a control unit having a data processor and a memory, the control unit configured to:
    obtain an indication that an actual flow rate or a target flow rate via the first port reaches or exceeds a predetermined threshold value, and
    upon obtaining a respective indication, open the bypass valve to enable a fluid flow through the fluid bypass path.

2. The flow control circuit according to claim 1, wherein the flow control valve assembly is configured to provide proportional flow control for at least one of the fluid supply path and the fluid return path.

3. The flow control circuit according to claim 1, wherein the flow control valve assembly comprises at least one of a proportional directional valve, a proportional valve in the fluid supply path, a proportional valve in the fluid return path, and a directional valve.

4. The flow control circuit according to claim 1, wherein the flow control valve assembly comprises a directional valve, a proportional directional valve, that has at least two valve positions, wherein in a first valve position, the directional valve provides a flow communication between the first port and the pressurized fluid source and between the second port and the fluid sink, and in a second valve position, the directional valve provides a flow communication between the first port and the fluid sink and between the second and the pressurized fluid source.

5. The flow control circuit according to claim 1, wherein the fluid bypass path is connected to the first port at one end, and wherein the fluid bypass path is connected at another end to the pressurized fluid source and/or to the fluid sink.

6. The flow control circuit according to claim 1, wherein the bypass valve is an on/off valve that is controllable by means of an electric or a fluidic control signal.

7. The flow control circuit according to claim 1, wherein the bypass path further comprises a flow rate control element configured to control a flow rate in the bypass path, and comprises at least one of a flow control valve, a pressure compensator or a pressure-compensated flow control valve.

8. The flow control circuit according to claim 1, further comprising a control unit, wherein the control unit is configured to perform the steps of:
  receiving an indication of a desired actuator position or actuator speed;
  determining a target flow rate for the first port based on the desired actuator position or actuator speed;
  controlling the flow control circuit so as to provide the target flow rate at the first port, wherein controlling the flow control circuit comprises
  determining if the target flow rate reaches or exceeds a threshold value;
  if the target flow rate reaches or exceeds the threshold value, opening the bypass valve; and
  controlling the flow control valve assembly to provide the target flow rate at the first port.

9. The flow control circuit according to claim 1, wherein the flow control valve assembly comprises a position sensor for determining a position of a proportional valve of the flow control valve assembly, the proportional valve controlling a flow via the first port, and wherein the flow control circuit further comprising a control unit, wherein the control unit is configured to perform the steps of:
  determining a position of the proportional valve based on a signal from the position sensor;
  if the position of the proportional valve is indicative of a flow rate via the first port that exceeds a predetermined threshold value, opening the bypass valve to enable a fluid flow through the fluid bypass path.

10. A system comprising:
  an actuator comprising a first chamber that experiences a larger volume change upon actuation of the actuator and a second chamber that experiences a smaller volume change upon actuation of the actuator; and
  the flow control circuit according to claim 1, wherein the first port of the flow control circuit is connected to the first chamber of the actuator and the second port of the flow control circuit is connected to the second chamber of the actuator.

11. A method of controlling a flow control circuit for an actuator, wherein the flow control circuit comprises a first port configured to be connected to a first chamber of the actuator; a second port configured to be connected to a second chamber of the actuator; wherein the first chamber experiences a larger volume change upon actuation of the actuator than the second chamber; a flow control valve assembly comprising one or more valves configured to provide a flow of pressurized fluid from a pressurized fluid source to one of the first and second ports along a fluid supply path and further configured to provide a flow of fluid from the other of the first and second ports to a fluid sink along a fluid return path; and a fluid bypass path comprising a bypass valve, wherein the fluid bypass path is connected to the first port and is connected in parallel to the control valve assembly, wherein the method comprises:
  opening, by a control unit having a data processor and a memory, or closing the bypass valve so as to allow or block the flow of fluid through the fluid bypass path.

12. The method according to claim 11, further comprising:

obtaining an indication that an actual flow rate or a target flow rate via the first port reaches or exceeds a predetermined threshold value;

upon obtaining a respective indication, opening the bypass valve to enable a fluid flow through the fluid bypass path.

13. A computer program product having a non-transitory computer readable medium, for controlling a flow control circuit, wherein the computer program comprises control instructions which, when executed by a data processor, cause the data processor to perform the method of claim 11.

* * * * *